E. T. THOMAS.
Sewing Machine.

No. 230,972. Patented Aug. 10, 1880.

Witnesses.
L. F. Connor.
Jos. P. Livermore.

Inventor.
Eddy T. Thomas,
by Crosby & Gregory, Attys

UNITED STATES PATENT OFFICE.

EDDY T. THOMAS, OF NEW YORK, N. Y., ASSIGNOR TO THE GOLD MEDAL SEWING MACHINE COMPANY, OF ORANGE, MASSACHUSETTS.

SEWING-MACHINE.

SPECIFICATION forming part of Letters Patent No. 230,972, dated August 10, 1880.

Application filed February 21, 1880.

*To all whom it may concern:*

Be it known that I, EDDY T. THOMAS, of the city, county, and State of New York, have invented an Improvement in Sewing-Machines, of which the following description, in connection with the accompanying drawings, is a specification.

This invention relates to sewing-machines, and has for its object the production of a durable, easy running, and rapidly-operating oscillating-shuttle machine. In this my machine the shuttle-carrier has a spirally-twisted horizontally placed stem, which is embraced and oscillated by a reciprocatable link attached to a crank-pin at the lower end of a rotatable shaft provided with a bevel-gear in engagement with and driven by a bevel-pinion on the needle-operating shaft, as in the Singer machine, such connection insuring positive motion for the needle and shuttle.

Figure 1:
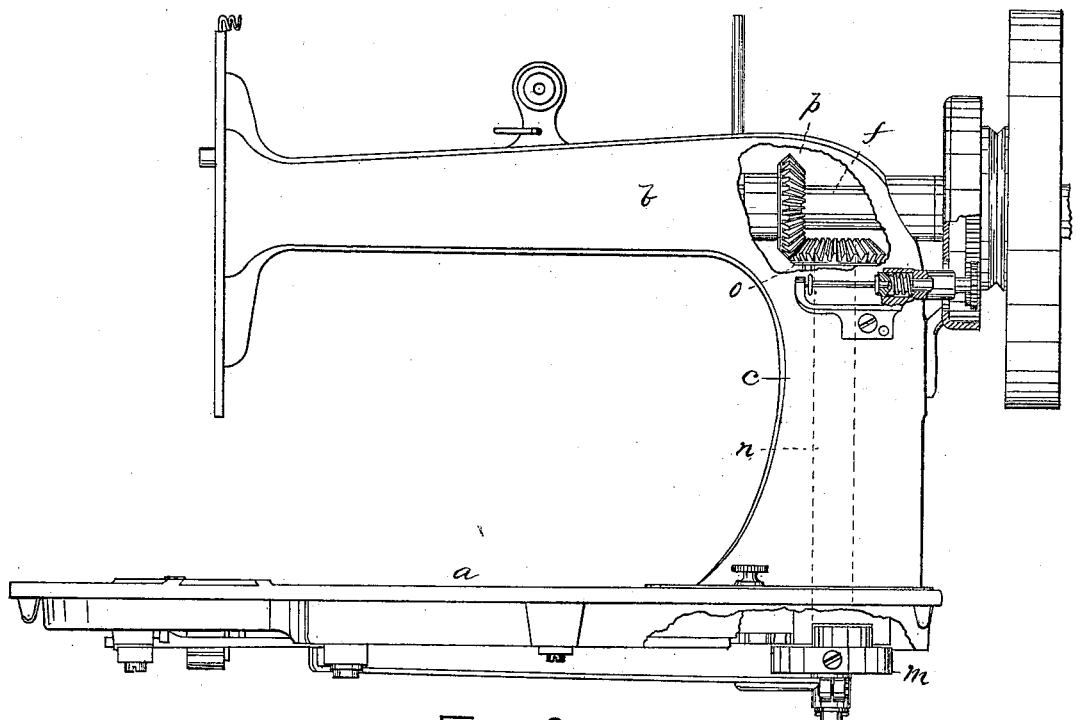
Figure 2:
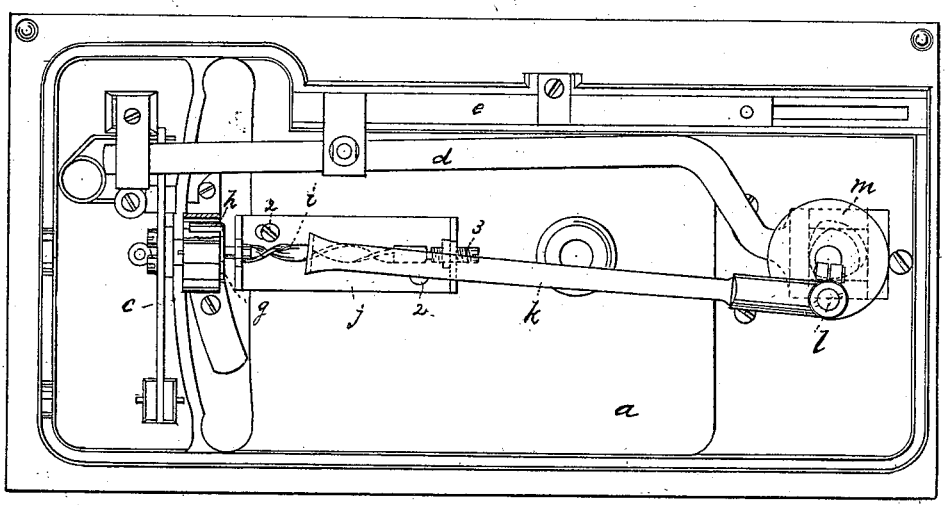
Figure 3:
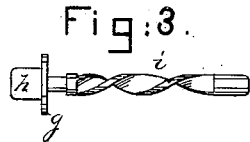

Figure 1 represents, in side elevation, partially in section, a sewing-machine showing my invention; Fig. 2, an under-side view thereof, and Fig. 3 a detail of the shuttle-carrier.

The cloth-supporting plate *a*, goose-neck *b*, feeding device *c*, its actuating and adjusting devices *d e*, and the positively-driven needle-actuating shaft *f* are all of usual construction. The shuttle-carrier *g* has a horn, *h*, to engage the shuttle (not shown) and turn it backward and forward or oscillate it as the carrier is oscillated. This carrier has connected with it a twisted shaft, *i*, made like the Grover & Baker looper-shaft, and somewhat like that shown in United States Patent No. 188,515.

The twisted shuttle-shaft is mounted in bearings or ears in a plate, *j*, adjustably connected with the under side of plate *a* by the screws 2. The end of the shaft *i* is supported by the adjustable centering-screw 3. The horizontally-extended twisted or spiral shaft *i* is embraced by the slotted end of link *k*, which, attached to the crank-pin *l* of the disk *m* on the rotatable vertical shaft *n*, is reciprocated rapidly, thereby quickly and easily oscillating the said shuttle-carrier. The bevel-pinion *o* is engaged with and driven by the bevel-pinion *p* on the main shaft *f*.

By placing the spirally-twisted shuttle-driving shaft in a horizontal position closely under the cloth-plate and actuating it by a horizontal link and crank-pin, such as described, the crank-pin being carried at the lower end of a vertical shaft, I am enabled to produce a most compact, simple, rapid, and easy-running machine, and at the same time retain the frame-work of the machine in the most popular shape for family machines.

I claim—

In a shuttle-sewing machine, the oscillatable shuttle-carrier, its horn, and the connected spirally-twisted shaft *i*, and the reciprocatable link *k* to embrace the said shaft, combined with the crank-pin, the vertical shaft *n*, and bevel-pinions and main driven shaft, substantially as described.

In testimony whereof I have signed my name to this specification in the presence of two subscribing witnesses.

EDDY TAYLOR THOMAS.

Witnesses:
SPENCER C. DOTY,
ALLEN SCHENCK.